United States Patent
Cui et al.

(10) Patent No.: US 6,463,047 B1
(45) Date of Patent: Oct. 8, 2002

(54) APPARATUS AND METHODS FOR PERFORMING COLLISION RESOLUTION FOR DIGITAL CONTROL CHANNELS

(75) Inventors: Jian Cui, Nepean; Wayne Dam; Alan Carter, both of Ottawa, all of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/138,965

(22) Filed: Aug. 24, 1998

(51) Int. Cl.[7] .................................................. H04J 3/00
(52) U.S. Cl. ........................................ 370/337; 370/347
(58) Field of Search .................................. 370/312, 328, 370/329, 331, 332, 333, 334, 336, 337, 345, 347, 349; 455/63, 65, 67.1, 67.3; 375/346, 347, 348, 349, 350

(56) References Cited

U.S. PATENT DOCUMENTS

| | | | | |
|---|---|---|---|---|
| 5,732,328 A | * | 3/1998 | Mitra et al. ................... | 455/69 |
| 5,761,250 A | * | 6/1998 | Lin ............................. | 375/344 |
| 5,790,606 A | * | 8/1998 | Dent ............................ | 375/348 |
| 5,828,658 A | * | 10/1998 | Ottersten et al. ........... | 370/310 |
| 6,018,661 A | * | 1/2000 | Raith et al. .................. | 455/437 |
| 6,026,121 A | * | 2/2000 | Sadjadpour ................. | 375/262 |
| 6,112,098 A | * | 8/2000 | Flint et al. ................... | 455/464 |

OTHER PUBLICATIONS

An Analytical Constant Modulus Algorithm, Alle–Jan van der Veen (member, IEEE) and Arogyaswami Paulraj (fellow, IEEE), IEEE Transactions on signal processing, vol. 44, No. 5, May 1996.

Fourth–Order Cumulant Structure Forcing Application to Blind Array Processing, Jean–Francois Cardoso, IEEE SP Workshop on SSAP–92, pp. 136–139, Victoria, Canada, IEEE 1992.

Super–Symmetric Decomposition of the Fourth–Order Cumulant Tensor Blind Identification of More Sources Than Sensors, Jean–Francois Cardoso, ICASSP–91.

* cited by examiner

*Primary Examiner*—Kwang Bin Yao
(74) *Attorney, Agent, or Firm*—Gibbons, Del Deo, Dolan, Griffinger & Vecchione

(57) ABSTRACT

An apparatus for performing collision resolution in a digital control channel which includes at least two antennas for receiving interfering signals, wherein each of the signals is associated with a network user, and a processor for processing the signals received by the antennas. The processor performs blind channel estimate calculations on the interfering signals to obtain channel information and to obtain a second signal. The second signal is selected for processing by a communication network.

2 Claims, 5 Drawing Sheets

APPARATUS AND METHODS FOR PERFORMING COLLISION RESOLUTION FOR DIGITAL CONTROL CHANNELS

FIELD OF THE INVENTION

The present invention pertains to apparatus and methods for performing collision resolution for digital control channels and, in particular, to apparatus and methods for performing collision resolution between clashing signals on reverse digital control channels.

BACKGROUND OF THE INVENTION

The Digital Control Channel (DCCH) was developed to enhance the capabilities of IS-136 (time division multiple access ("TDMA")) cellular systems.

These enhancements included the potential increase in the control channel's data capacity, improved capabilities related to the mobile station sleep mode for saving battery life and improved capabilities related to short messages services. The logical DCCH structure is composed of a forward channel and a reverse channel. The major functions of the forward link (FDCCH) include broadcasting and access control for mobile users. The reverse link (RDCCH) is dedicated to mobile random access capabilities and functions.

Typically, mobile slot collisions and problems related thereto may occur when multiple users attempt to access the same TDMA slot. Specifically, when two or more users, having comparable signal levels of typically less than a 6 dB power separation, attempt to simultaneously access the reverse link in the IS-136 TDMA system, the receiver at the base station usually fails to detect the signals from any of the users. The base station will then typically request that all of the users re-send their messages after a random time delay.

Although techniques are known which address signal detection in a fading environment, these techniques do not improve system throughput by canceling the co-channel interference in the absence of a reference signal. In conventional systems, a unique word (Coded Digital Verification Color Code (CDVCC word)) in each TDMA slot may be used as a training sequence in order to cancel the co-channel users. However, since all contending users of the RDCCH have identical SYNC words, and no unique CDVCC word, these techniques may not be utilized for improving system throughput.

The DCCH TDMA slot structure is based on the IS-136 digital traffic channel frame. The following is a brief description of how RDCCH handshaking protocol works. When the control channel is utilized by the base station (i.e., the base station is transmitting on the FDCCH), the base station will broadcast continuously to all of the mobiles in that cell. For example, if a mobile desires to transmit on a particular slot, it detects whether that slot is being utilized (i.e. it detects if the base station set a flag bit in the slot). If the flag is not set the mobile will attempt to transmit on that slot and will query the base station as to whether the slot is available.

Once the base station receives and processes this message, the base station sends a reply message, at the next available slot, to the mobile, indicating that a call has been set up. However, the call will not be setup if the base station cannot detect the signal which is sent by the mobile. This failure to detect the signal sent by the mobile could occur if another mobile, transmitting at a similar power level, such as a signal power level within 6 dB of the other mobile's. signal, attempts to access the slot at the same time. This simultaneous transmission results in a slot collision and a subsequent corruption of the received data. If a clash should occur, with the base station failing to acknowledge that the slot has been allocated, each of the clashing mobiles will typically delay their respective operation for a random time period before attempting to acquire the slot again.

The failure of prior art systems to resolve collisions between mobile units, and thus requiring a retransmission, results in inefficient use of network capacity and decreased throughput.

Accordingly, it is an object of the present invention to provide apparatus and methods for performing collision resolution in communications networks.

It is another object of the present invention to provide apparatus and methods for performing collision resolution on digital control channels.

It is still another object of the present invention to provide apparatus and methods for performing collision resolution between clashing signals on a reverse digital control channel.

It is yet another object of the present invention to provide apparatus and methods for performing collision resolution utilizing blind channel estimates in communication networks and/or on digital control channels.

It is another object of the present invention to provide apparatus and methods for performing collision resolution in communication networks which provides increased network throughput.

It is another object of the present invention to provide apparatus and methods for performing collision resolution in a communication network by utilizing multiple blind channel estimates in a cascaded fashion.

It is yet another object of the present invention to provide apparatus and methods for resolving clashes between signals from users of multiple mobile units who attempt to access the same time slot on the same channel.

It is yet another object of the present invention to provide apparatus and methods for resolving collisions between signals from users of mobile units without having to rely upon the utilization of unique information which corresponds to each of the mobile units.

These and other objects of the invention will become apparent to those skilled in the art from a review of the detailed description of the invention taken in conjunction with the drawings which follow.

SUMMARY OF THE INVENTION

In accordance with the teachings of the present invention, these and other objects may be accomplished by the present apparatus and methods for performing collision resolution on interfering signals in digital control channels. An embodiment of the present invention includes at least two antennas, a receiver connected to the antennas and a processor electrically connected to the receiver. The antenna receive interfering signals from mobile stations and provide these signals to the receiver. The receiver may amplify and/or filter the received signals, and/or translate the signals to a baseband frequency. The processor is configured to receive these interfering signals from the receiver, perform a blind channel estimate calculation on each to determine at least one channel parameter thereof and to provide at least one other signal derived at least in part from the channel parameter, to a communication network.

Another embodiment of the invention includes means for receiving interfering signals, means for performing a blind channel estimate calculation on the interfering signals, and means for providing at least one other signal to a communication network. The blind channel estimate is employed to obtain at least one channel parameter of the interfering signals and the signal provided to the communication network is derived at least in part from the channel parameter.

Yet another embodiment of the invention includes a method for performing collision resolution on interfering signals in a digital control channel. The method includes receiving interfering signals on a digital control channel, performing a blind channel estimation calculation on each of the interfering signals to obtain channel information thereof, and using the channel information to obtain a preferred signal.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The present invention will be more clearly understood by reference to the following description of an exemplary embodiment in conjunction with the accompanying Drawings, in which.

DETAILED DESCRIPTION OF THE INVENTION

The present invention provides apparatus and methods for improving throughput on the reverse link RDCCH by resolving collision problems which typically occur when multiple users or multiple mobile units attempt to access the same TDMA slot. The present invention simultaneously demodulates one or more signals when a clash occurs. In this manner, only the undetected mobile signals need to be retransmitted, thereby increasing throughput on the RDCCH.

Figure 1:
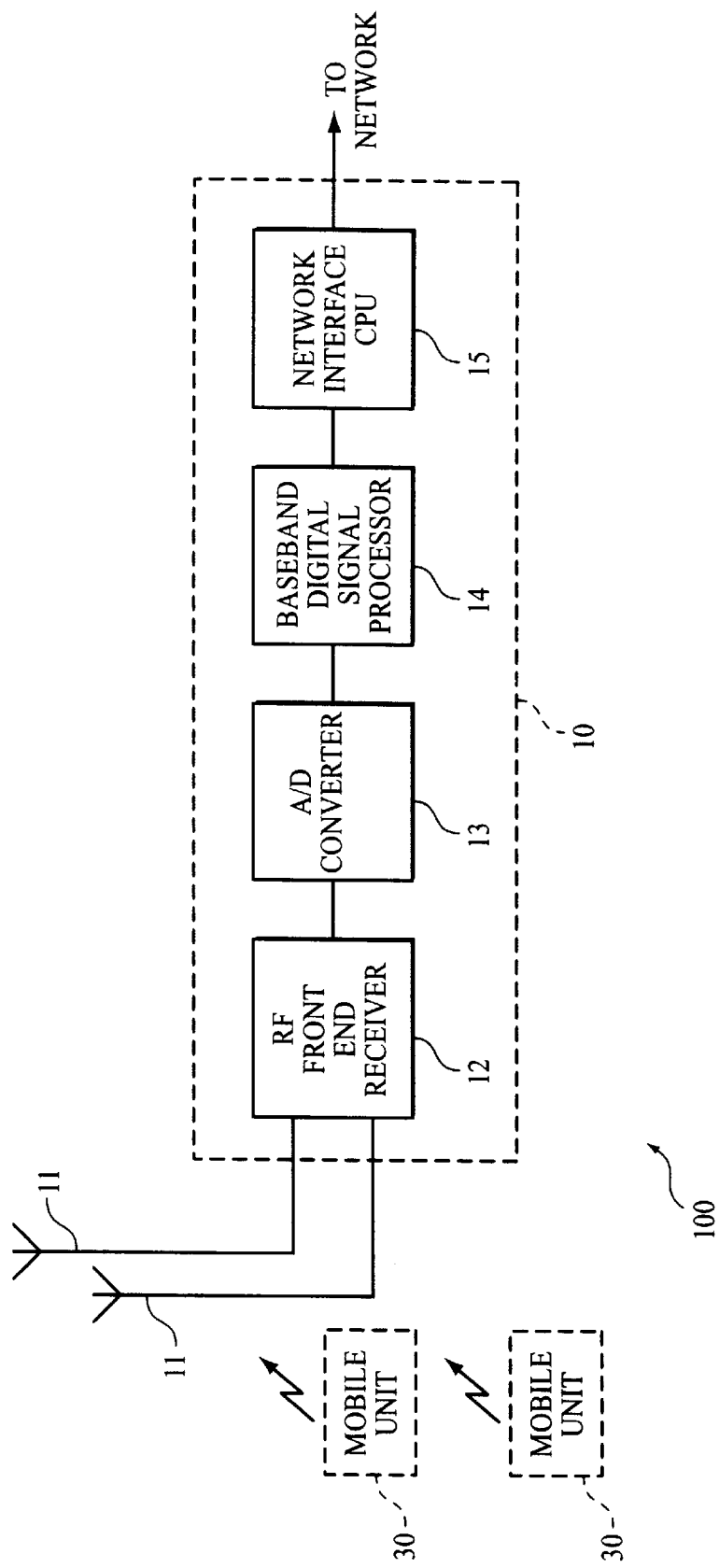
FIG. 1 illustrates the apparatus of the present invention, in block diagram form.

FIG. 1 illustrates, in block diagram form, the apparatus of the present invention which is designated generally by the reference numeral 100. In the preferred embodiment, the apparatus 100 is a base station receiver. The apparatus 100 includes a cellular base station radio 10 which includes at least two antennas 11, for receiving signals from the mobile units 30. For the purposes of this explanation, the mobile units 30 will only include those which are within the same cell and which may attempt to access the same TDMA slot. However, it may be possible (i.e. in fringe situations, etc.) for two or more mobile units to be in different cells and still require the services of the present invention. The cellular base station radio 10 also includes an RF front end receiver 12, an analog to digital (A/D) converter 13, a baseband digital signal processor 14 and a network interface central processing unit (CPU) 15. The apparatus 100 may be utilized in conjunction with cellular communication systems and, as a result, the cell sites may be sectorized so as to reduce interference.

The RF front end receiver 12 receives the signals which are transmitted by the mobile units 30 and received by the antennas 11. The RF front-end receiver 12 may amplify and/or filter the signals, and/or translate the signals to a baseband frequency. In a preferred embodiment, the baseband frequency is approximately 0 Hz, although the system may be designed to utilize a different baseband frequency or range of frequencies. The output signals from the RF front end receiver 12 may be sampled by the A/D converter 13 and be subsequently processed by the baseband digital signal processor 14. The A/D converter 13 translates the continuous time signals into a discrete digital signal which may then be processed by the baseband digital signal processor 14.

The baseband digital signal processor 14 demodulates the sampled signals and extracts the data bits transmitted from each mobile unit 30, from the respective TDMA slot. The data bits are then transmitted to the network interface central processing unit (CPU) 15 which formats the data bits. The output signals from the network interface central processing unit 15 are then transmitted to the network and are ultimately received and processed further by a remote device (not shown) which may be another communication device or a computer.

If two or more mobile units 30 attempt to transmit on the same TDMA slot, the respective signals and messages will interfere with one another during transmission. Thus the combined signals may be received by each of the antennas 11. The combined RF signals may then be down-converted, sampled, and processed in the baseband digital signal processor 14. The baseband digital signal processor 14 operates pursuant to an algorithm which performs clash resolution which serves to mitigate the impact of the interference between the multiple signals. It will be recognized by those skilled in the art that the present invention performs operational routines pursuant to an algorithm(s) which may be implemented in software designed to operate in conjunction with a microprocessor-based digital processor or system, or which may be implemented in hardware such as an application specific integrated circuit (ASIC) or the like. Once the clash resolution routine is performed, the data from the selected mobile unit will be transmitted to the communication network.

The apparatus 100 performs clash resolution routines for the received signals at the digital signal processor 14 to enhance one of the received signals, which is defined to be the "selected" or "wanted" signal and to cancel or reduce the power level of signals which are determined to be the "unwanted" signals.

Figure 2A:
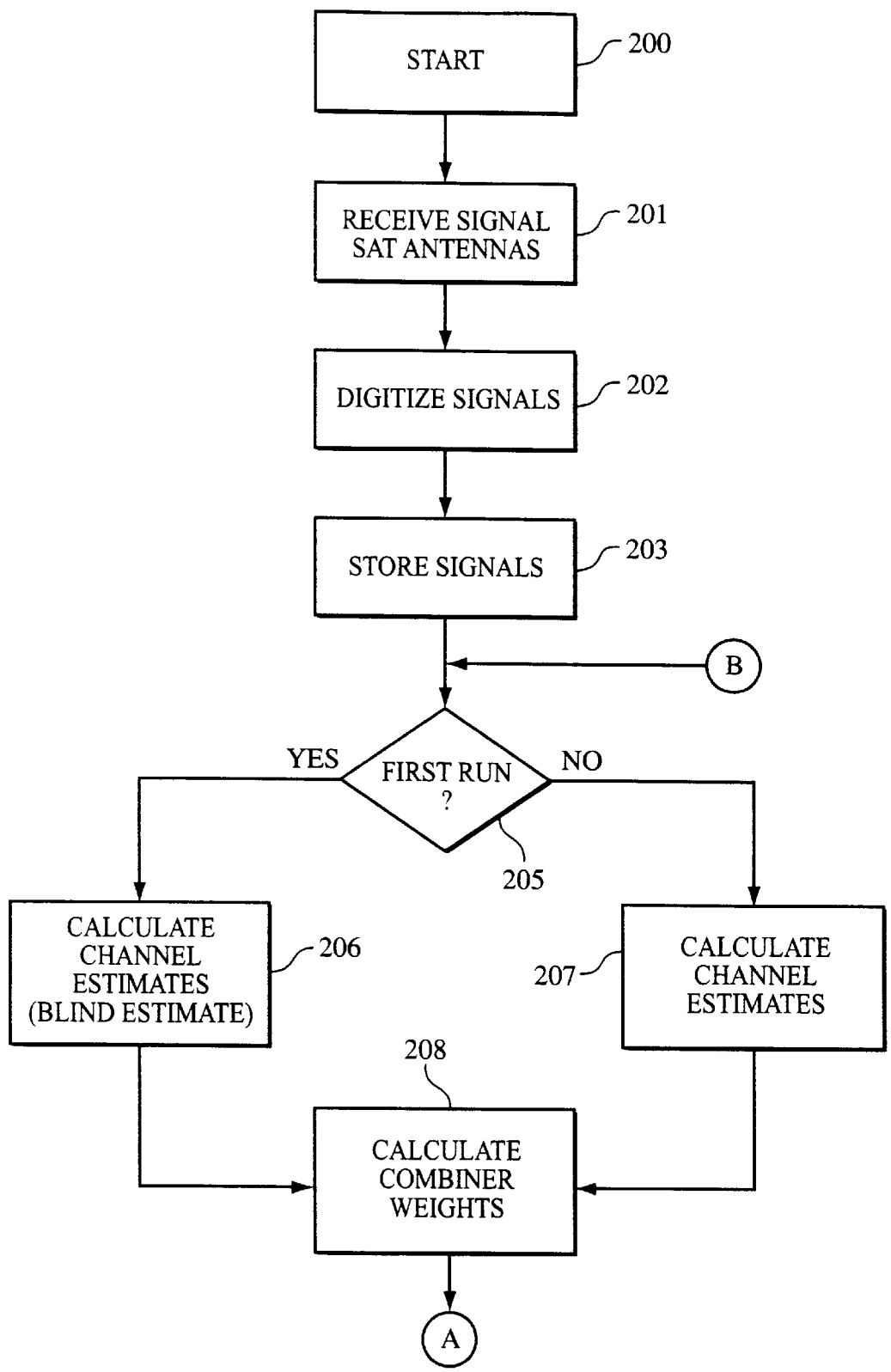
FIG. 2 illustrates a flow chart of a preferred embodiment operation of the apparatus.
Figure 2B:
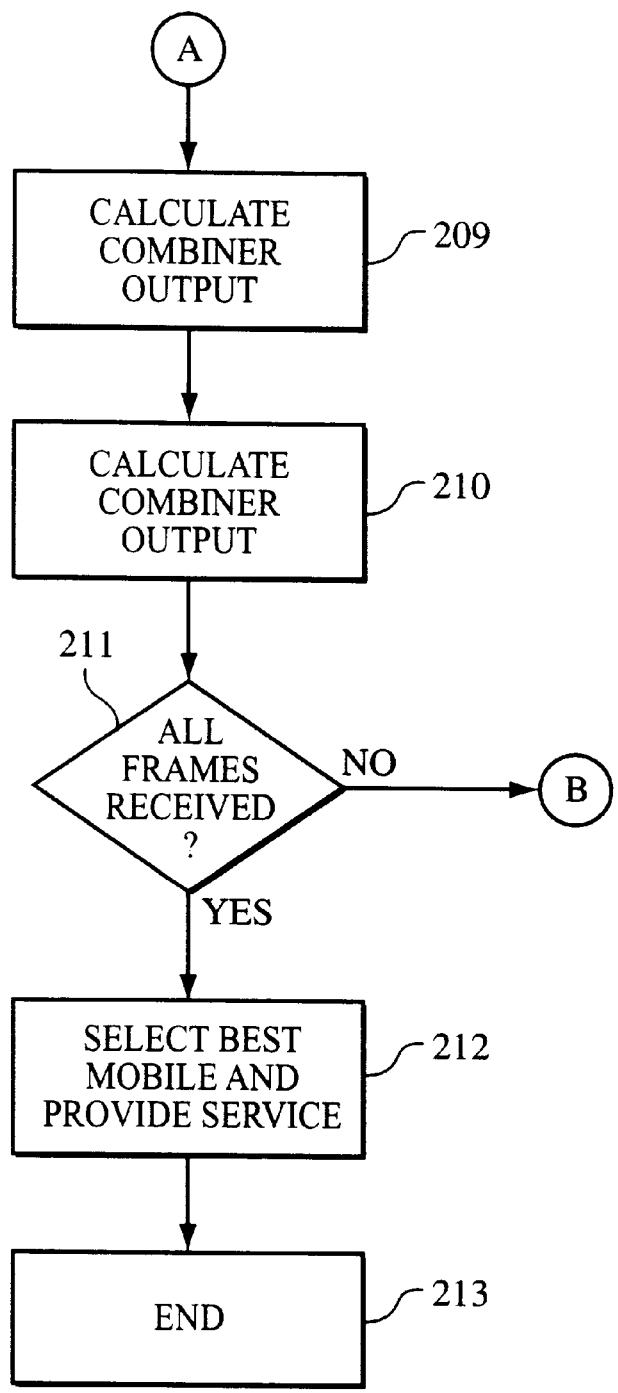

In the preferred embodiment, the apparatus 100 performs the above-described functions by utilizing software which includes two subroutines or programs, namely an initialization routine, which is performed first, and a processing routine which is performed subsequent to the initialization routine. While two subroutines are disclosed, those skilled in the art will recognize that this may be designed as a single program/subroutine or as multiple programs/subroutines. FIG. 2 illustrates a flow chart of the operation of the apparatus 100, and, in particular, the operation of the digital signal processor 14. Operation of the apparatus 100 commences at step 200 upon the receipt of signals from multiple mobile units 30. The signals are received at the respective antennas 11 and transmitted to the RF front end receiver 12 at step 201. Output signals for the plurality of signals are then transmitted to the A/D converter 13. At step 202, the A/D converter digitizes the received signals. The output signals from the A/D converter 13 are then transmitted to, and stored in, the baseband digital signal processor 14, at step 203.

At step 205, the baseband digital signal processor 14 determines if the algorithm is a first run. If it is, the digital signal processor may perform a blind estimate calculation at 206 to determine an initial channel estimate for all of the clashing users. The blind channel estimation routine is performed to distinguish between the selected and the interfering signals. One of the blind channel estimates is arbitrarily selected and applied to the calculation of the combiner weights. Those skilled in the art will recognize that although one blind channel estimate is preferably chosen arbitrarily, it is possible to set parameters for selecting which blind channel estimate to use.

In the preferred embodiment, a reference signal, which is correlated with the wanted signal, may be utilized in order to calculate a channel estimate. Typically, the blind channel estimates are performed on sections of a time division multiple access (TDMA) channel. In the preferred embodiment, each mobile unit 30 would have a unique slot assigned to it. Upon completion of blind estimation calculations, the baseband digital signal processor 14 will have acquired the wanted signal.

The blind estimation calculation routine, which is performed, at step 206, may be any one of, or combination of, those blind estimation routines which are known to those skilled in the art. In this regard, Applicant hereby incorporates by reference herein the teachings of "Fourth-Order Cumulant Structure Forcing: Application to Blind Array Processing," by Jean-Francois Cardoso, in Proc. 6th SSAP Workshop on Statistical Signal and Array Processing, pp. 136–139, October 1992. "An Analytical Constant Modulus Algorithm," by Alle-Jan van der Veen and Arogyaswami Paulraj, in IEEE Trans. Signal Processing, vol. 44(5): 1136–1155, May 1996, and "Super-Symmetric Decomposition of the Fourth-Order Cumulant Tensor: Blind Identification of More Sources Than Sensors," by Jean-Francois Cardoso, in Proc. ICASSP, pp. 3109–3112, 1991.

In the preferred embodiment, the blind channel estimation algorithm, is either an analytical constant modulus algorithm (ACMA) or a higher order statistics (HOS) algorithm, which is used to calculate an initial channel estimate for the clashing signals. Employing HOS may allow for the resolution of clashes when the number of signals is greater than the number of antennae.

If the baseband digital signal processor 14 determines at step 205 that the algorithm is not in a first run (i.e. the first frame has already been received) the digital signal processor may proceed to step 207 and utilize the received frame to estimate the channel rather than using another blind channel estimate, although it is also possible to use another blind channel estimate, but this would increase the processing complexity.

For purposes of illustration, the processing routines described herein will be described in conjunction with the processing of two clashing signals. It is understood, however, that the apparatus and methods described herein may be utilized to process any number of clashing signals depending on the algorithm chosen and the number of antennae.

After calculating the channel estimates at either step 206 or 207, a complex weighting function is performed on each of the sampled signals which are obtained at the antennas 11. The weights are chosen to minimize the mean square error of the signals or to maximize the signal to interference plus noise ratio (SINR). The complex weighting of the received antenna signals results in a phasing of the two signals in such a manner so as to enhance the selected or wanted signal while canceling the unwanted signal(s). The two weighted signals are then summed or combined together, with the resulting signals, in the preferred embodiment, having a maximum signal to interference plus noise ratio. By maximizing the signal to interference plus noise ratio, post-data demodulation of the signals is enhanced, thereby reducing the probability of error in the resulting data.

The weights which are calculated by the baseband digital signal processor 14 at step 208, function as a self-tuning spatial method filter known as a Weiner filter. This may be accomplished by maximizing the gain of a desired signal and by minimizing the gain of the interfering signals.

By way of example, an embodiment of the combiner may be illustrated mathematically as follows:

$$\text{let } x(t) = \begin{vmatrix} x_1(t) \\ x_2(t) \end{vmatrix}$$

denote the vector of signals received on the two antennas. These signals are combined with a set of weights:

$$w(t) = \begin{vmatrix} w_1(t) \\ w_2(t) \end{vmatrix}$$

to produce an output signal:

$$r_0(t) = x_1(t)w_1^*(t) + x_2(t)w_2^*(t),$$

(*=complex conjugate).
A set of weights that maximizes the signal to interference plus noise ratio is given by:

$$w(t) = \text{inv}(R_{xx}(t)) r_{xd}(t)$$

(inv=matrix inverse)
where $$R_{xx}(t) = E[x(t)x^{*T}(t)]$$

(E=expected value)
($^T$=transpose)
is the autocorrelation matrix of the received signals and $$r_{xd}(t) = E[x(t)d^*(t)]$$

(d(t)=reference signal)
is the correlation vector of the received signal. In forming the weight vector, w(t) the correlation vector between the antennae is used to distinguish between the signal of interest and the interfering signal(s). In a multiple user environment, the channel can be modeled as:

$$x(t) = As(t) + n(t)$$

Figure 4:
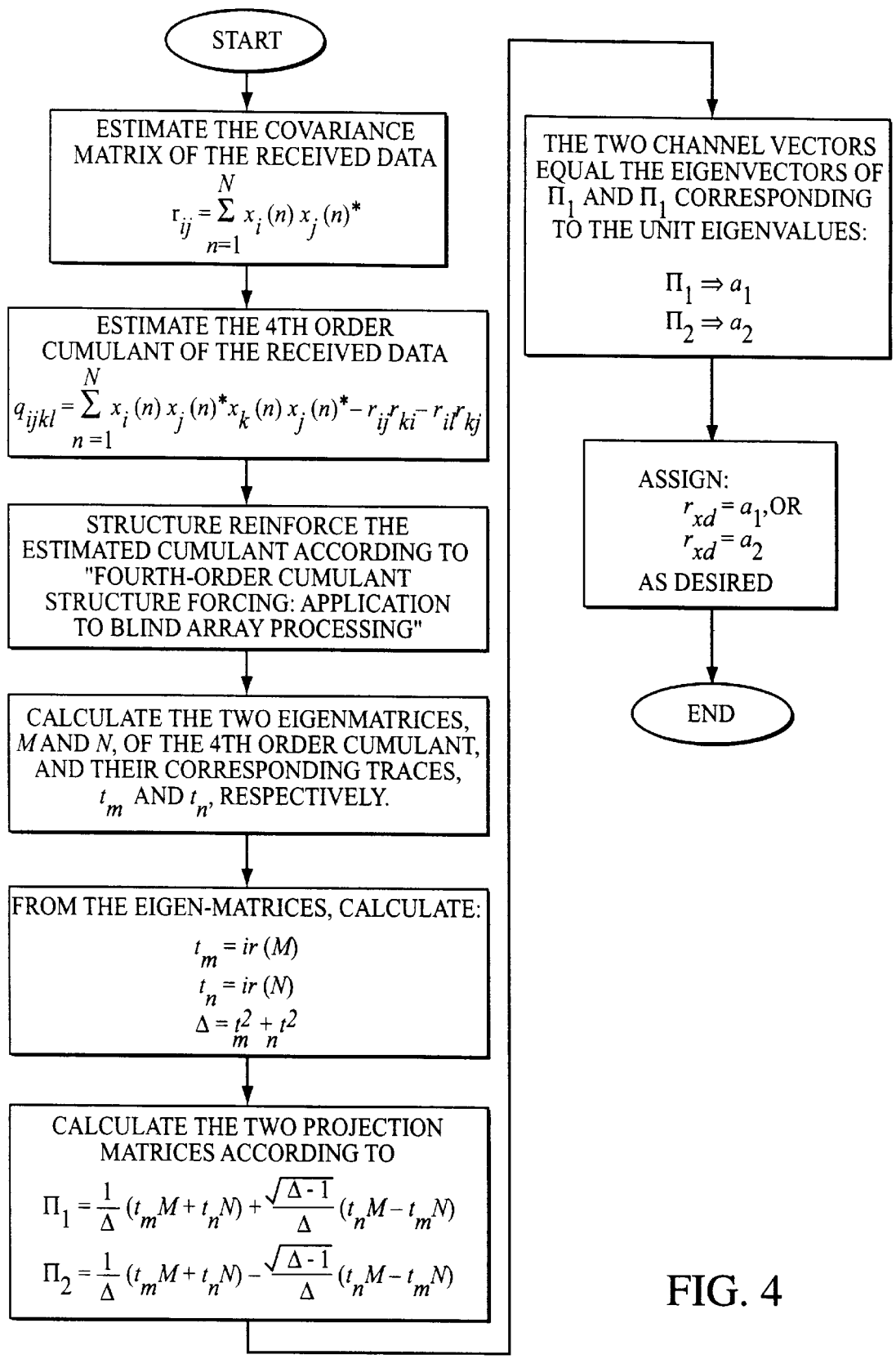
FIG. 4 illustrates a flow diagram of a blind channel estimation calculation.

(A is the channel vector)
(n(t) is noise)
The blind channel estimation algorithm is shown in FIG. 4. In the case of a two signal clash:

$$x(t) = a_1 s_1(t) + a_2 s_2(t) + n(t),$$

($s_1(t)$ and $s_2(t)$ correspond to the two signals and vectors $a_1$ and $a_2$ contain the complex fade coefficients for signals 1 and 2 respectively going to each of the receiver antenna.)
The desired signal would be either $s_1(t)$ or $s_2(t)$, thus $$r_{xd1} = E[x(t)s_1^*(t)] \text{ or}$$

$$r_{xd2} = E[x(t)s_2^*(t)]$$

depending on which is the selected signal. Since the signals and the noise are uncorrelated:

$$r_{xd1} = E[x(t)s_1^*(t)]$$
$$= E[(a_1s_1(t) + a_2s_2(t) + n(t))s_1^*(t)]$$
$$= a_1E[|s_1(t)|^2] + a_2E[s_2(t)s_1^*(t)] + E[n(t)s_1^*(t)]$$

$$r_{xd1} = a_1$$

and similarly for signal 2:

$$r_{xd2} = a_2.$$

In the absence of a unique training sequence for estimating $r_{xd}$, the channel vectors $a_1$ and $a_2$ are estimated directly. This is done using fourth order statistics of the antennae outputs. In component form the correlation matrix is:

$$r_{ij} = [x_i(t)x_j^*(t)], \quad 1 \leq i,j \leq 2$$

The fourth order cumulant is similarly defined as:

$$q_{ijkl} = E[x_i(t)x_j^*(t)x_k(t)x_1^*(t)] - r_{ij}r_{kl} - r_{il}r_{kj}, \quad 1 \leq i,j,k,l \leq 2.$$

At step 209, the digital signal processor 14 calculates combiner output data. At step 210, the combiner output data is demodulated and, at step 211, another test is performed to determine if a prerequisite number of data frames have been obtained or utilized during the processing routine.

The number of data frames, which is deemed sufficient for operational calculations, will depend upon the specific application of the apparatus 100. For example, utilization of the apparatus for transmitting electronic mail (e-mail) may require a certain number of frames while a paging operation may require a different number of frames. If, at step 211, the requisite number of frames for the particular application have been obtained or utilized in the combiner output calculations, then the operation of the processing routine will proceed to step 212 and the base station will provide service to the mobile unit which transmitted the wanted signal. The data obtained from the digital signal processor 14 will be transmitted to the network interface CPU 15 and will be transmitted to the network in order to service the mobile unit 30 associated with the wanted signal. Thereafter, operation of the apparatus 100 will cease at step 213.

If, at step 211, it is determined that the requisite number of frames have not been obtained or utilized, then program operation will return to step 205 and the above routine will be repeated with new data. In the above described manner, the apparatus 100 of the present invention provides service to a mobile unit which is selected through crash resolution on signals received at the apparatus 100.

In an alternate embodiment of the present invention, the apparatus 100 may be utilized in a cascaded fashion so that the messages from multiple clashing mobile units may be extracted and processed. Since multiple blind channel estimates may be calculated by the digital signal processor 14, the data which corresponds to these multiple estimates may be utilized in order to extract multiple clashing signals. The criteria upon which the best mobile signal(s) may be selected, in the preferred embodiment, may be based upon raw bit error rate (BER) measurements which are performed subsequent to signal demodulation. In the preferred embodiment, the best bit error rate measurement may be found by selecting the measurement which has the lowest bit error rate. Other processing and/or selection schemes may also be employed wherein some or all of the signals may be utilized with the clashing signals being allocated to other forward digital control channels or the signals could be arbitrarily chosen.

Figure 3:
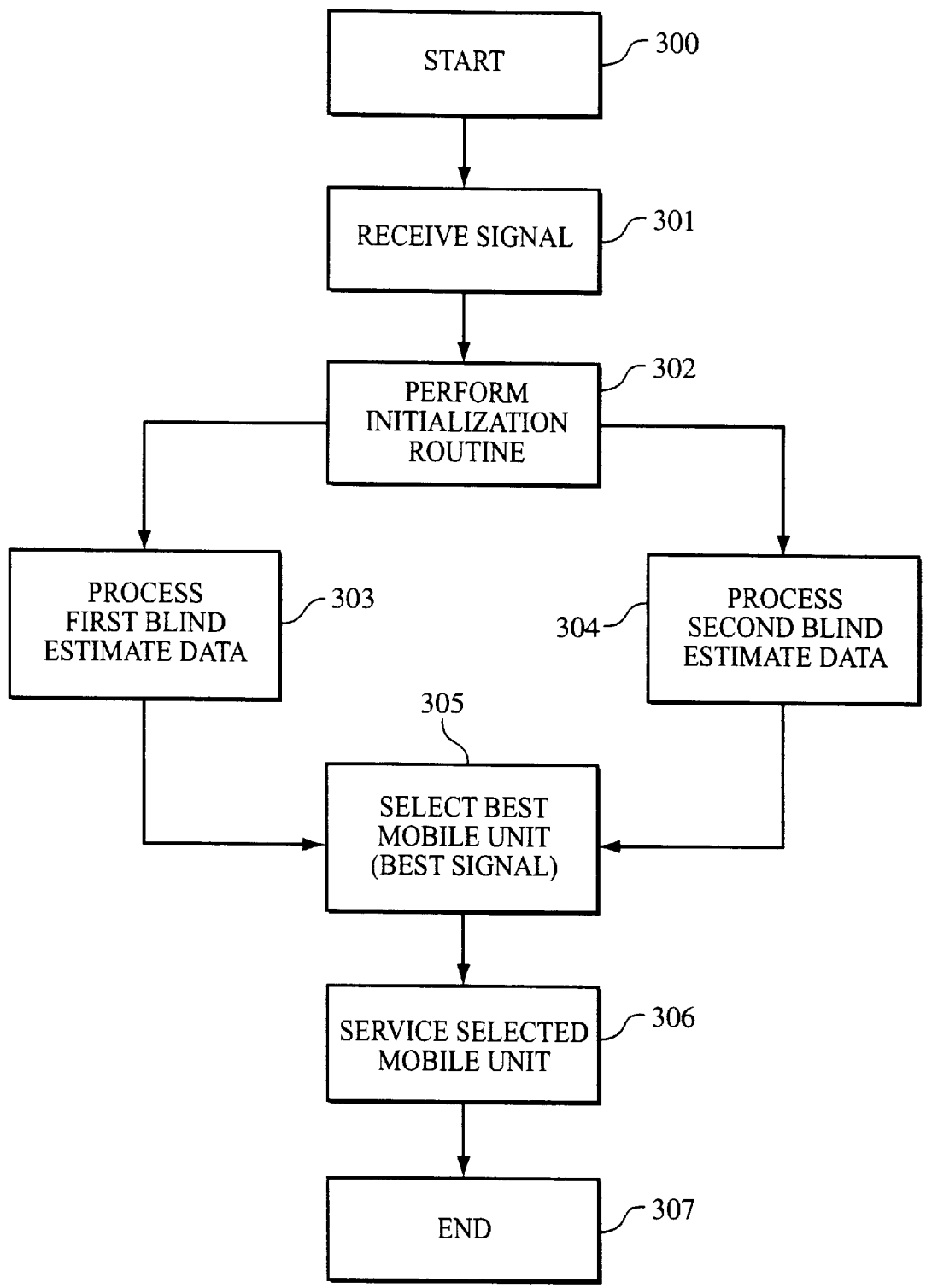
FIG. 3 illustrates a flow chart of a cascaded embodiment operation of the apparatus of the present invention.

FIG. 3 illustrates a flow chart of the operation of the apparatus 100 in a cascaded embodiment. The operation of the apparatus 100 commences at step 300. At step 301, the clashing mobile signals are received by the antennas 11. At step 302, the received signals are processed pursuant to an initialization routine, which includes the operations performed at steps 202–206 of FIG. 2. The processing which occurs during the initialization routine yields a first blind channel estimate and a second blind channel estimate. Although the operation of the embodiment of FIG. 3 is described herein for selecting two signals, it is recognized that the apparatus of the present invention may be utilized to select and process any number of signals. At step 303, the apparatus 100 will process the first blind channel estimate from a first signal. At step 304, the apparatus will process the second blind channel estimate from a second signal. The processing routines, at steps 303 and 304 may be performed simultaneously or sequentially. The processing routines performed at steps 303 and 304 include the operations which are performed at steps 205–211 of FIG. 2 (beginning at step 208).

At step 305, the mobile unit corresponding to the signal which has the best (lowest) bit error rate (i.e. using a cyclic redundancy check) is selected for receiving the priority in the clash resolution routine, although other prioritization schemes may be employed. At step 306, the signal of the mobile unit selected for service will be processed at the network interface CPU 15 and, the mobile unit will be serviced by the communication network. Operation of the apparatus 100 will cease at step 307.

The present invention provides apparatus and methods for resolving clashes between users of multiple mobile units who attempt to access the same slot, at the same time, on the same TDMA channel. By reducing the impact of these signal clashes, which would otherwise require a re-transmission by all of the clashing mobile units, the data throughput of the communication network may be increased in a significant manner. In this regard, one mobile unit could be selected for service while only the remaining mobile units would have to re-transmit their signals. The present invention also serves to resolve clashes between multiple users of mobile units without having to rely upon the utilization of unique information which corresponds to each of the mobile units.

In an alternate embodiment, the present invention also provides apparatus and methods for cascading multiple stages of operational processing routines so as to facilitate the extraction of multiple signals from multiple clashing mobile units. In this embodiment, the mobile units could then be allocated, by the apparatus, to other unused slots which could, in turn, further improve the overall system data throughput rate as retransmission of messages could be rendered unnecessary.

While the present invention has been described and illustrated in various preferred embodiments, such descriptions and illustrations are merely illustrative of the present invention and are not to be construed to be limitations thereof. In this regard, the present invention encompasses any and all modifications, variations, and/or alternate embodiments, with the scope of the present invention being limited only by the claims which follow.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A method of improving throughput in a time division multiple access (TDMA) cellular system that employs a digital control channel (DCCH), the DCCH, having a forward link (FDCCH) and reverse link (RDCCH), the FDCCH, including broadcasting and access control for mobile units, the RDCCH being dedicated to mobile random access capabilities and functions, all contending users of the RDCCH having identical synchronization words and no unique coded digital verification color code (CDVCC) word, the method comprising:

operating a base station that has a plurality of antennae configured to receive signals that are transmitted from mobile units, the base station having DCCH; and resolving collision problems on the RDCCH of the DCCH between multiple signals that are received by the plurality of antennae and that clash with each other while attempting to access a common TDMA slot, the resolving including distinguishing between selected signals and signals that interfere without basing the distinguishing on differences in CDVCC words, enhancing the selected signals and reducing a power level or cancelling the interfering signals, the distinguishing including performing a blind channel estimation routine that yields blind channel estimates, choosing one of the blind channel estimates, and thereby distinguishing between those one of the multiple signals that are to be selected and those that interfere based on the choosing.

2. A method as in claim 1, wherein the blind channel estimation routine is selected from a group consisting of an analytical constant modulus algorithm (ACMA) and a higher order statistics (HOS) algorithm, which calculates an initial channel estimate for clashing ones of the multiple signals, the HOS algorithm being configured to allow for a resolution of clashes when a number of the multiple signals is greater than a number of the antennae.

* * * * *